(12) United States Patent
Fein et al.

(10) Patent No.: US 7,849,096 B2
(45) Date of Patent: Dec. 7, 2010

(54) MULTIPLE PARAMETER DATA MEDIA SEARCH IN A DISTRIBUTED NETWORK

(76) Inventors: Gene S. Fein, 760 East St., Lenox, MA (US) 01240; Edward Merritt, 139 Lime Kiln Rd., Lenox, MA (US) 01240

( * ) Notice: Subject to any disclaimer, the term of this patent is extended or adjusted under 35 U.S.C. 154(b) by 355 days.

(21) Appl. No.: 11/685,536

(22) Filed: Mar. 13, 2007

(65) Prior Publication Data

US 2008/0228717 A1 Sep. 18, 2008

(51) Int. Cl.
*G06F 17/016* (2006.01)
(52) U.S. Cl. .................. 707/765; 707/769; 707/773; 707/759
(58) Field of Classification Search ............... 707/1–10, 707/759
See application file for complete search history.

(56) References Cited

U.S. PATENT DOCUMENTS

| | | | | |
|---|---|---|---|---|
| 6,344,861 | B1* | 2/2002 | Naughton et al. | 715/769 |
| 6,448,987 | B1* | 9/2002 | Easty et al. | 715/834 |
| 6,603,487 | B1* | 8/2003 | Bennett et al. | 715/751 |
| 6,738,760 | B1* | 5/2004 | Krachman | 1/1 |
| 6,920,459 | B2* | 7/2005 | Dedhia et al. | 707/102 |
| 7,587,387 | B2* | 9/2009 | Hogue | 707/3 |
| 7,590,562 | B2* | 9/2009 | Stoppelman | 705/26 |
| 2001/0035880 | A1* | 11/2001 | Musatov et al. | 345/764 |
| 2003/0193481 | A1* | 10/2003 | Sokolsky | 345/173 |
| 2004/0083274 | A1* | 4/2004 | Katiyar et al. | 709/217 |
| 2005/0234878 | A1* | 10/2005 | Dettinger et al. | 707/3 |
| 2006/0174209 | A1* | 8/2006 | Barros | 715/764 |
| 2008/0092159 | A1* | 4/2008 | Dmitriev et al. | 725/34 |
| 2009/0063953 | A1* | 3/2009 | Kraus et al. | 715/234 |

* cited by examiner

*Primary Examiner*—Charles Kim
*Assistant Examiner*—Sheryl Holland
(74) *Attorney, Agent, or Firm*—Stolowitz Ford Cowger LLP (57) ABSTRACT

Disclosed is a method and system directed to a management of distributed database data and file access and retrieval by providing a multiple parameter data media search. Conventional models generate search results based upon the text entered into the search box by the user. Unfortunately, the existing conventional models have certain limitations in use, distribution, and deployment. The present invention relates to the creation of multi-parameter search tools that allow for searched materials to be quantified by numerous logical searching parameters. An example embodiment (i) provides a plurality of parameters, each of the plurality of parameters having a respective range of terms; (ii) displays the plurality of parameters; (iii) displays the respective ranges of terms; (iv) solicits from the user at least one search selection from the displayed ranges of terms; (v) performs a search from the at least one search selection; and (vi) returns a search result to the user.

33 Claims, 9 Drawing Sheets

MULTIPLE PARAMETER DATA MEDIA SEARCH IN A DISTRIBUTED NETWORK

BACKGROUND OF THE INVENTION

It is well known that search engines can provide a list of linked results for users who have input a series of alphanumeric characters, characters, word, or series of words to search from. Search engines are made up of elaborate databases that utilize word matching with programmed logic tools to sort through information present in, or available to, the search engine database to generate the search results for the user. Currently, searching for data using a search engine via nearly every online search mechanism functions by the user inputting a searched for term or terms into an input box via the user interface and then clicking on (selecting) a button labeled "search" or by pressing the return key. The terms are passed to the server search program and database where terms used by the user generate matches based upon the term, combination of terms or programmed logic present in the search database. The results are displayed for the user, usually via an html type of page with a predetermined number of results and many others available through numbered and paginated cached or centrally served results.

Conventional models address the current search format that people have grown familiar with and that engineers have grown accustomed to programming and maintaining. These models generate search results based upon the text entered into the search box by the user. Some search mechanisms also allow the user to enter a date range, such as online newspaper searches, to further filter the search results and provide a more refined range of results in the process. Other advanced search parameters include numeric range, file format, usage rights, and where in a document the searched for term appears. Each one of the searchable parameters above may help generate refined results once the search is initiated by the user. Each search parameter is defined by entering information in a box or clicking upon information in a drop down menu or list.

Unfortunately, the existing conventional uses have certain limitations in use, distribution, and deployment. By employing a system that solely emphasizes the 'text in a box' searching style with a database results program left to find matching text with some custom tools and rules, the broad limitations of search quickly become apparent when the user is presented with over 100,000 search matches by the search engine database system. The search engine database system generates information in response to the user's search request. While utilizing the advanced search tools available above can help refine results, the process is burdensome from a user interface perspective. The process does not provide enough useful search parameters to truly generate a search engine response that is commensurate with currently available technological resources in terms of search parameters, database design, programming, and user interface.

SUMMARY OF THE INVENTION

The present invention relates to the creation of multi-parameter search tools that allow for queries to be quantified by numerous logical searching parameters. These parameters are displayed across a range of flexible graphical user interface tools. The underlying data available for search are coded or recoded in the database to be searchable and sortable by the given parameters.

In a preferred embodiment is a method and system that (i) provides a plurality of parameters, each of the plurality of parameters having a respective range of terms; (ii) displays the plurality of parameters; (iii) displays the respective ranges of terms; (iv) solicits from the user at least one search selection from the displayed ranges of terms; (v) performs a search from the at least one search selection; and (vi) returns a search result to the user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

The present invention, in accordance with one embodiment relates to the creation of a search engine that utilizes a series of graphical displays representing different searchable parameters to establish a new searching mechanism or to enhance an existing text-based searching mechanism. The system creates a simple way to set search parameters and then to have the database search for the user defined parameters to return a more precise set of results to the user.

Figure 1:
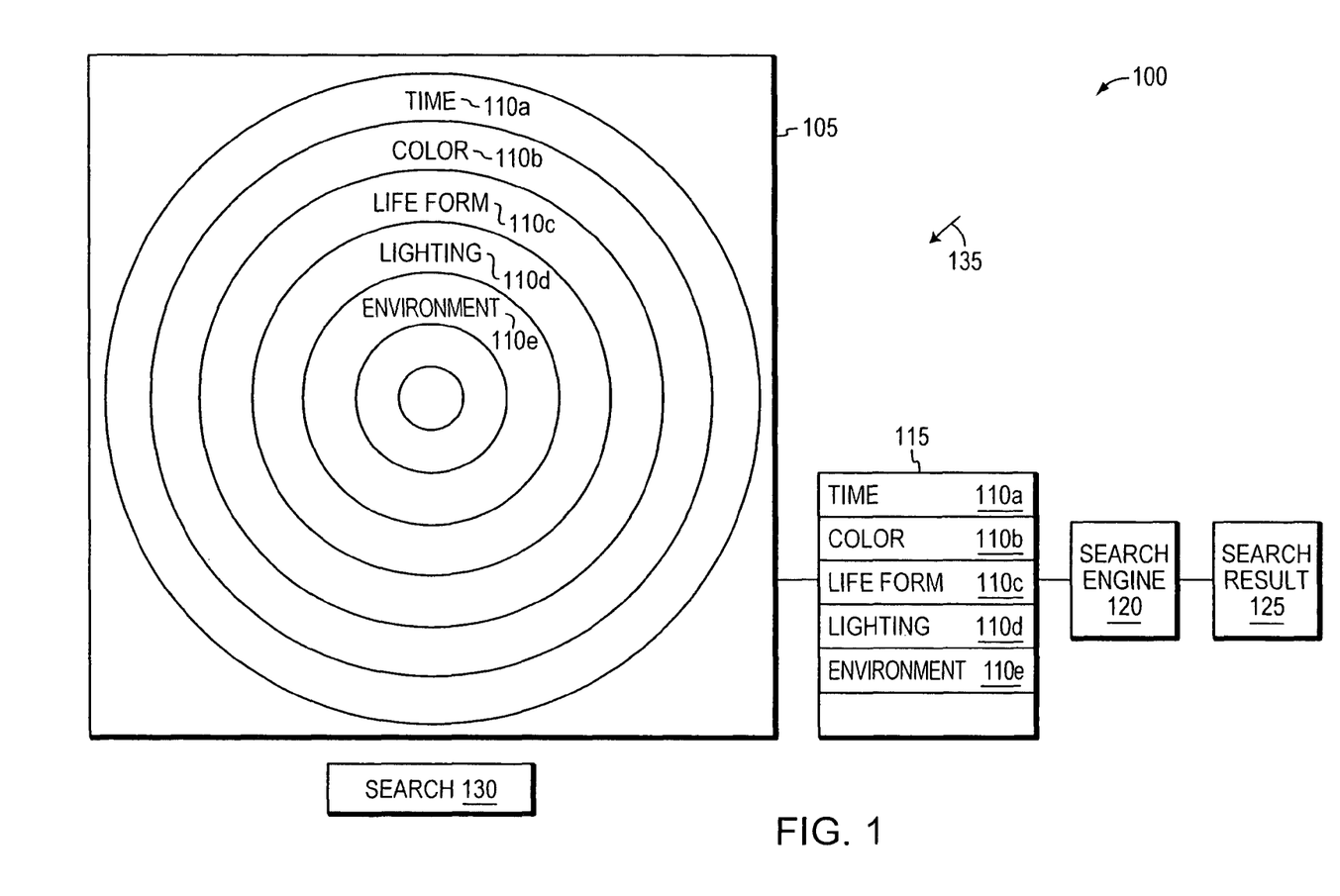
FIG. 1 is an exemplary schematic of a system for providing multiple parameter data media search embodying the present invention.

FIG. 1 is a schematic of a system 100 for providing multiple parameter data media search and shows exemplary architecture of a system embodying the present invention. The system 100 may include a first display unit 105, second display unit 115, search engine 120, search result 125, and pointer 135. The first and second display units 105, 115 have a plurality of parameters, such as time 110$a$, color 110$b$, life form 110$c$, lighting 110$d$, and environment 110$e$. The first display unit 105 having the plurality of parameters 110$a$, 110$b$, . . . , 110$e$ may be in a graphical format such as concentric rings. Each of the concentric rings is associated with a respective one of the plurality of parameters. For example, the outermost ring may be time 110$a$ while the innermost ring may be environment 110$e$. It should be understood that there may be more or less parameters as indicated above. Each of the parameters 111$a$, 110$b$, . . . , 110$e$ is associated with a respective range of terms as shown and further discussed in FIG. 4. A user may direct a pointer 135 to at least one of the parameters 110a, 110b, . . . , 110e and the associated respective range of terms (not shown) to create a search selection. The search engine 120, in turn, may perform a search based on the search selection culminating in the search result 125. For example, the user may create a search selection using the parameters, such as time 110a and environment 110e. It is to be understood that the user may use one or all of the search parameters to create the search selection.

Figure 2:
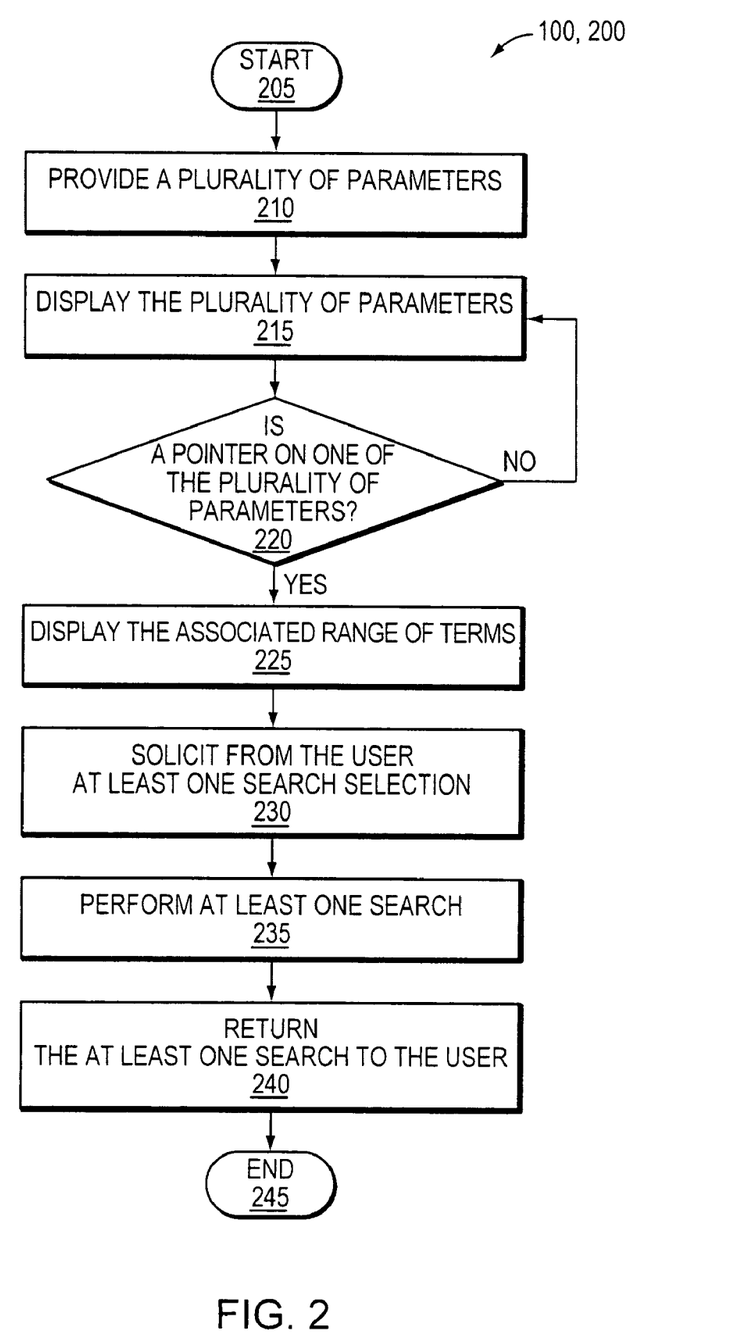
FIG. 2 is an exemplary flow diagram performed in accordance with an embodiment of the present invention.

FIG. 2 is an exemplary flow diagram 200 of system 100 performed in accordance with an embodiment of the present invention. The flow diagram 200 of system 100 starts at 205 and provides parameters, such as time 110a, color 110b, life form 110c, lighting 110d, and environment 110e (210). Each of the parameters 110a, 110b, . . . , 110e is associated with a respective range of terms. The system 100 then displays the parameters (215). The system 100 determines whether a pointer is on one of the plurality of parameters (220). If the pointer is not on one of the plurality of parameters, the system 100 displays the parameters (215).

If the pointer is on one of the parameters, the system 100 displays the associated ranges of terms (225). The system 100 then solicits from a user a search selection (230). The user may direct a pointer 135 to the at least one of the parameters 110a, 110b, . . . , 110e and the associated range of terms (not shown) to create the search selection. The search engine 120, in turn, may perform a search based on the search selection (235). The system 100 responsively returns search results 125 to the user (240) and then ends (245). For example, the user may create a search selection using the parameters, such as time 110a and environment 110e. It is to be understood that the user may use one, a subset, or all of the search parameters to create the search selection.

Figure 3:
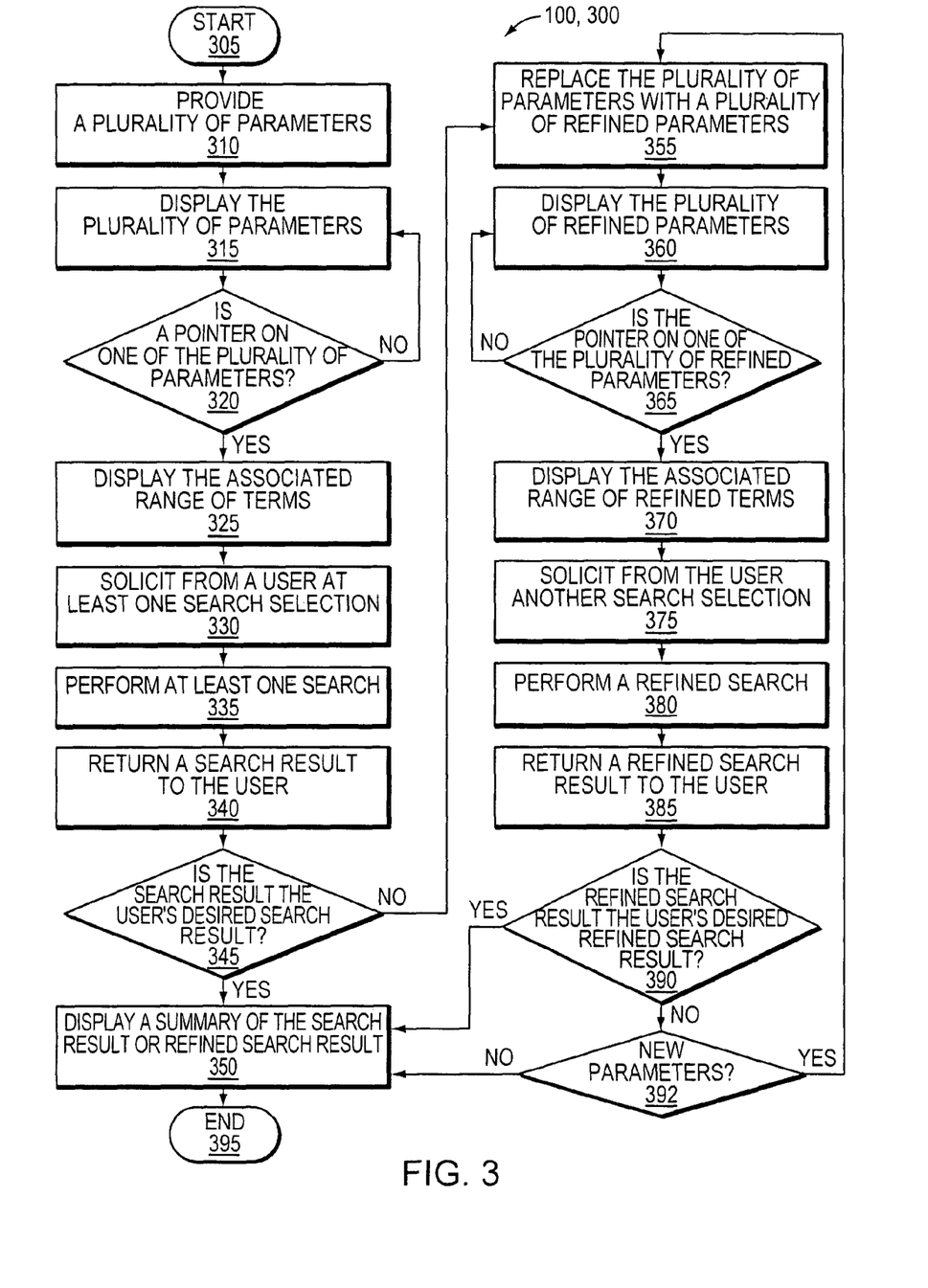
FIG. 3 illustrates an exemplary flow diagram performed in accordance with another embodiment of the present invention.

FIG. 3 is an exemplary flow diagram 300 performed in accordance with another embodiment of the present invention. The flow diagram 300 starts at 305 and the system 100 provides at 310 parameters, such as time 110a, color 110b, life form 110c, lighting 110d, and environment 110e, as shown in FIG. 1. Each of the parameters 110a, 110b, . . . , 110e is associated with a respective range of terms. The system 100 then displays the parameters (315). The system 100 determines whether a pointer is on one of the parameters (320). If the pointer is not on one of the parameters, the system 100 displays the parameters (315).

If the pointer is on one of the parameters, the system 100 displays the respective associated ranges of terms (325). The system 100 then solicits from a user at least one search selection (330). The user may direct a pointer 135 to the at least one of the parameters 110a, 110b, . . . , 110e and the respective associated range of terms (not shown) to create the search selection. The search engine 120, in turn, may perform a search based on the search selection (335). The system 100 may return search results 125 to the user (340). The system 100 determines if the returned search result is the user's desired search result (345). If the search result is the user's desired search result, the system 100 may display a summary of the search result (350). The summary may include a number of match results.

If the search result is not the user's desired search result, the system 100 may replace the plurality of parameters with refined parameters (355). The refined parameters may be more refined based on the previous search result. The system 100 may then display the refined parameters (360). The system 100 determines whether a pointer is on one of the refined parameters (365). If the pointer is not on one of the refined parameters, the system 100 displays the refined parameters (360).

If the pointer is on one of the refined parameters, the system 100 displays the respective associated ranges of refined terms (370). The system 100 then solicits from a user another search selection (375). The search engine 120, in turn, may perform a refined search based on the another search selection (380). The system 100 returns search results 125 of the refined search to the user (385). The system 100 determines if the search result is the user's desired refined search result (390). If the search result is the user's desired refined search result, the system 100 may display a summary of the refined search result (350). The summary may include a number of match results.

If the search result is not the user's desired refined search result, the system 100 repeats the process to determine if there are new parameters that are more refined based on previous search result (392). If there are new parameters then the flow chart 300 recommences at 355. If there are no new parameters, then the flowchart 300 displays a summary of the refined search result (350) before ending (395).

Figure 4:
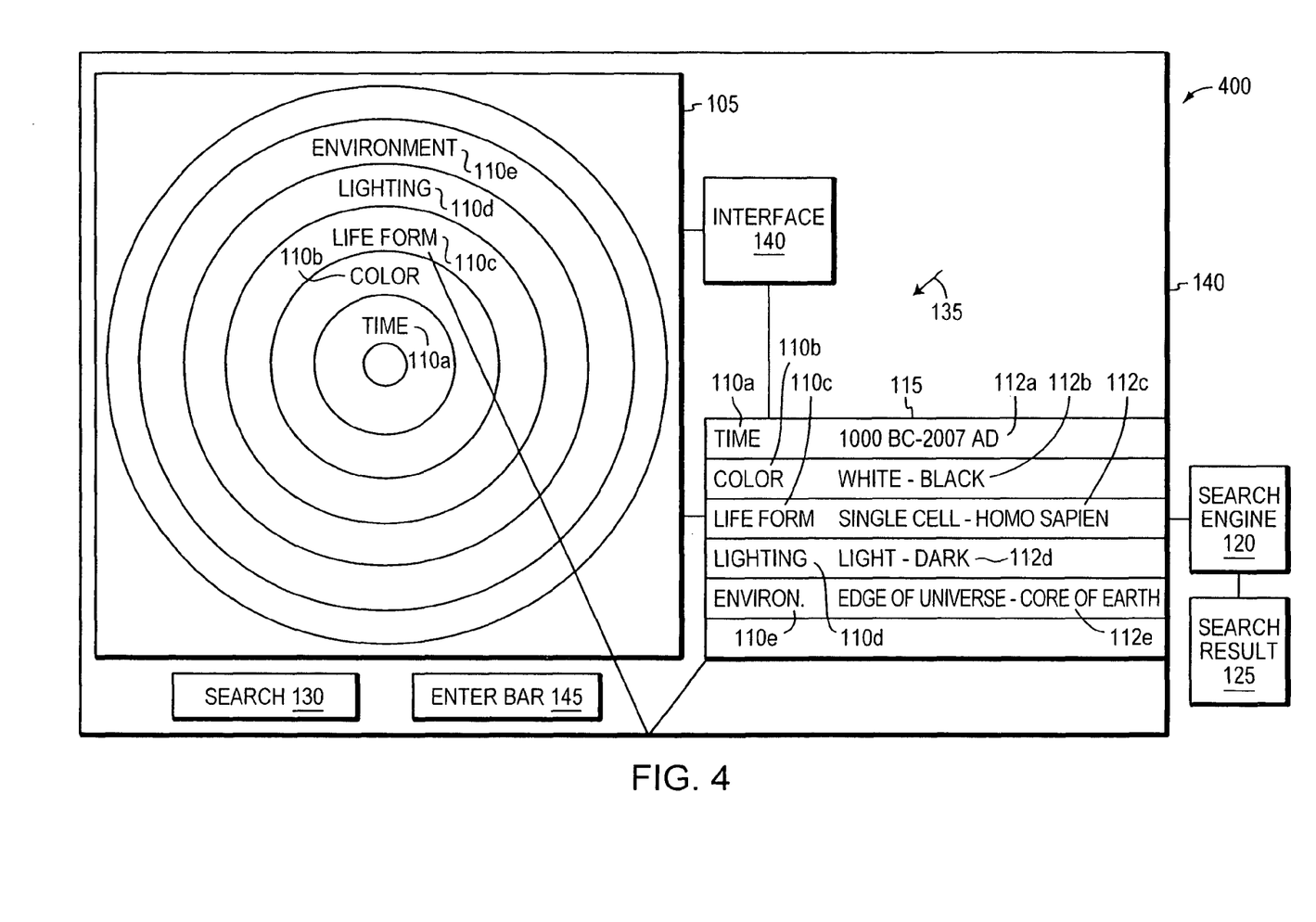
FIG. 4 is an exemplary schematic of a system embodying the present invention along with a plurality of parameters and respective ranges of associated terms.

FIG. 4 is a schematic diagram of an exemplary architecture of another system 400 embodying the present invention along with a plurality of parameters 110a, 110b, . . . , 110e and respective ranges of associated terms 112a, 112b, 112c, 112d, . . . , 112e. The system 400 may include a first display unit 105 having a plurality of parameters 110a, 110b, . . . , 110e, interface 140, second display unit 115, search engine 120, search result 125, search bar 130, and enter bar 145. The first and second display unit 105, 115, search bar 130, and enter bar 145 may be on a touch screen 140.

Each of the plurality of parameters 110a, 110b . . . , 110e may be associated with the respective ranges of terms 112a, 112b, 112c, 112d, and 112n. For example the parameter time 110a may be associated with the range of terms 1000 BC to 2007 AD 112a, parameter color 110b is associated with the range of terms white to black 112b, etc. In an embodiment, a user selects among a set of associated range of terms 112a, 112b, 112c, 112d, and 112n in the ringed parameters 110a, 110b, . . . , 110e to establish a refined and accurate search. These parameters 110a, 110b, 110c, 110d, 110e may be represented graphically, by the use of horizontal bars, circles or any other graphical representation that can be utilized to display a range of data. Parameters to be set can range from one to more than one hundred parameters. Parameters can be selected from a list or can be presented as a list of default parameters that may then be available to select from a list. For example, one parameter could be chronology ranging from the beginning of time to the year 3,000. Another parameter could include color 110b ranging in respective value from clear to white to black 112b and all colors in the spectrum in between that are representable in the first and second display units 105, 115. Life form 110c may range from single cell to homo sapiens 112c.

The range of terms may be categorized by subjects. The subjects may be geographical locations, the earth, shapes, things, mood, people, places, traits, sound, purchase, celebrity, colleges, vacations, matchmaking, sports, video, community, music, film, cooking, recipes, of the body etc. The user may also create a hierarchical search using first named or positioned parameters to define a search. In this case if a user were to select "films" as a parameter and then select from the film parameter horror films and then select "blood" from the body parameter and yellow for the color parameter then the resulting search query (search selection) would be horror films with yellow blood. It should be understood that there are many more subjects and parameters than discussed above.

Creating a set of simple parameters such as people, places and things is relatively easy; it is when assigning and correlating data to many search results that the legwork of database technology really begins. For example, it is easy to code the film, "*Murder of SpongeBob Squarepants*" into a database field as a movie, and also to code it as a horror movie, but when adding a movie with yellow as a primary color and blood being present then the correlation of this data becomes more work for programmers to input. However, the results of a multi-parameter search can be startlingly accurate via this invention of user interface having a first and second display units 105, 115 and advanced database labeling, sorting and interrelating programming for search.

Using the parameters in FIG. 4, an example of a search is a user looking for a red parakeet to purchase. The user may begin a search selection using the following parameters and associated range of terms:

| parameter: | range of terms: |
|---|---|
| time 110a | 2007 AD 112a |
| color 110b | red 112b |
| life form 110c | bird 112c |

After creating a search selection (query), the user via an input device (not shown), such as a mouse, moves a pointer 135 on the enter bar 145 and by operationally selecting on the input device, a search engine 120 may perform the search using the search selection. Alternatively, if the display is a touch screen 140, the user may simply touch the enter bar 145 to perform the search. A search result 125 may return and display on a touch screen 140 another set of refined parameters or a list of red birds that exist in 2007 AD.

If the search produces another set of refined parameters, they may include geographic location, type of food that the bird feeds on, species, etc. The user may create another search selection (query) using the refined parameters and associated range of refined terms:

| refined parameter: | range of refined terms: |
|---|---|
| geographic location | Mexico |
| food | berries |
| species | amazon viridigenalis |

This refined search may produce a red-crowned parrot as a search result.

In another embodiment, the search selection may not only include the default search parameters and the respective associated ranges of terms, but in addition, an entry that is inputted by the user in the search bar 130. For example, the user may enter the word "amazon virdigenalis" into the search bar 130 as part of the initial search selection (query). The search result may be an indication (text, graphic, video, multi-media, etc) of the red-crowned parrot.

Figure 5:
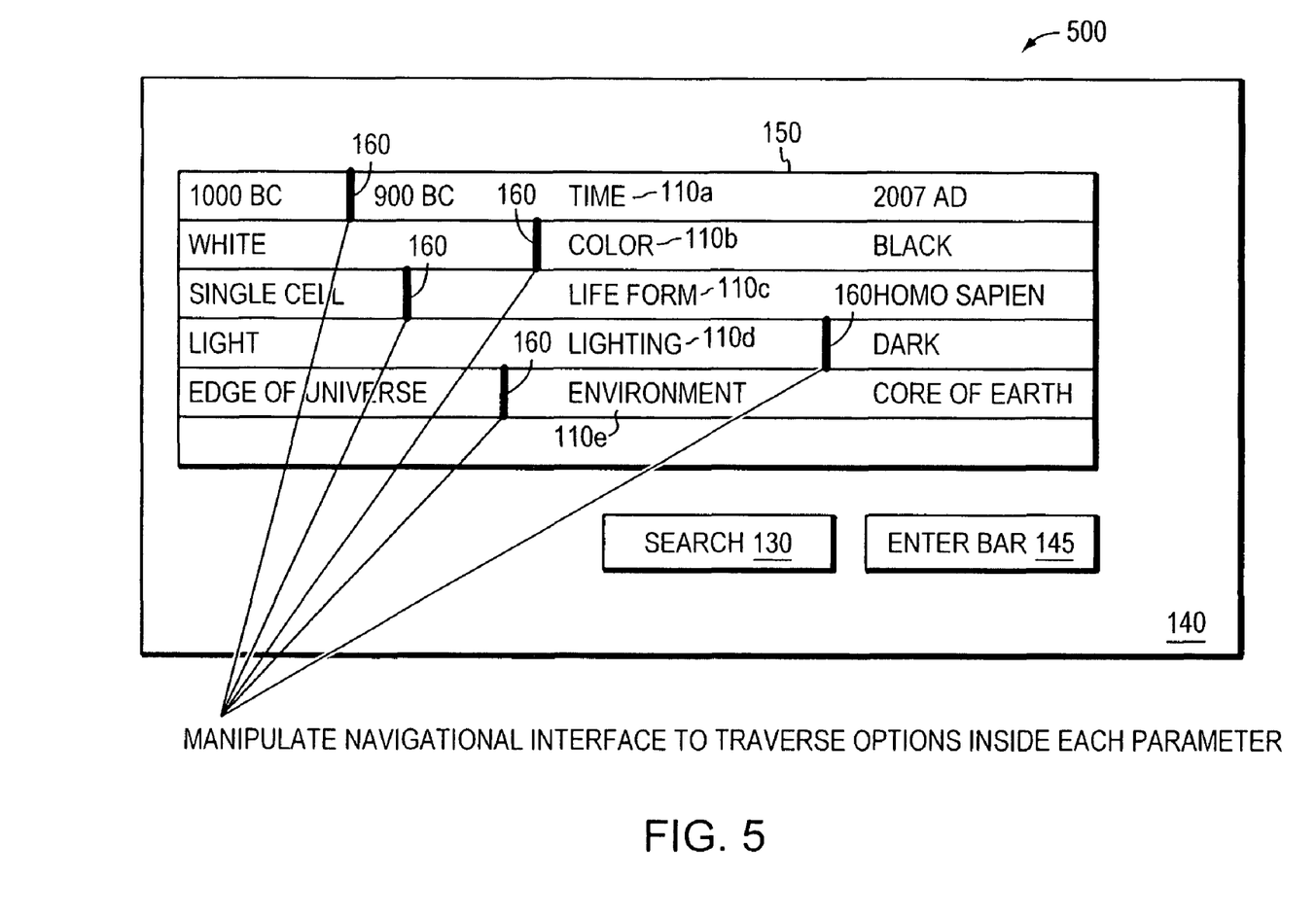
FIG. 5 is a schematic diagram of another exemplary system displaying a multiple bar display unit embodying the present invention.

FIG. 5 is a schematic diagram of another exemplary architecture of a system 500 displaying a multiple bar display unit 150 embodying the present invention. The multiple bar display unit 150 may have a plurality of parameters 110a, 110b, . . . , 110e, each of which may associate with a respective range of terms 112a, 112b, 112c, 112d, . . . , 112e. The user may create a search selection by moving the slide-able bar 160 for each of the search parameters 110a, 110b, . . . , 110e to the desired associated range of terms 112a, 112b, 112c, 112d, . . . , 112e. It is to be understood that the user does not have to choose all of the parameters to create the search selection. The user may also type in a search term in the search bar 130 as part of the search selection.

Figure 6:
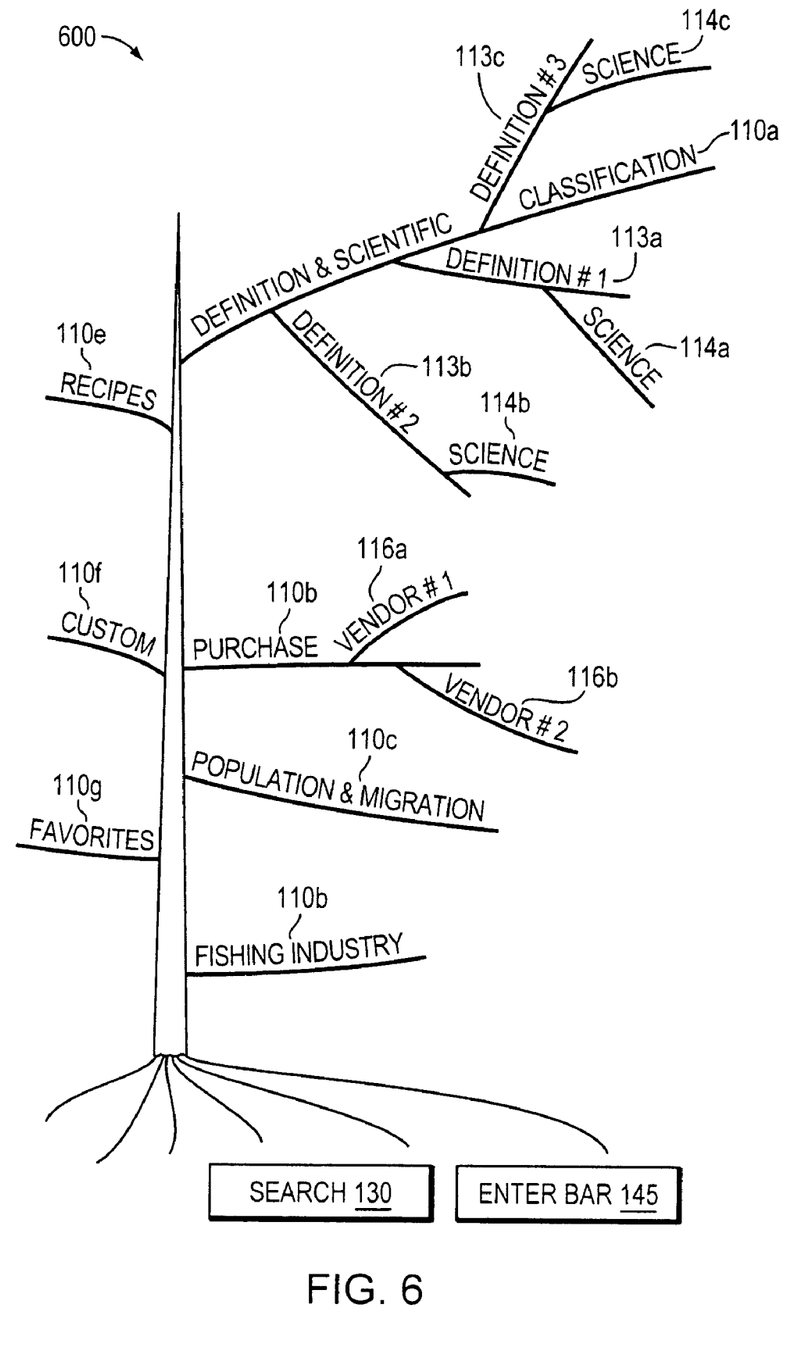
FIG. 6 is an exemplary schematic diagram of a graphical tree method of searching embodying the present invention.

FIG. 6 is another embodiment utilizing a graphical tree 600 method of searching. This method can be used to trace down a single term or word and then follow the branch-like structure where the root search term began and make selections on larger and smaller and still smaller and then capillary sized branches until the root search term has resulted in the chosen destination.

For example, on the coast of Spain a user once ate the most wonderful sardines. In order to locate that specific region and perhaps purchase some of those delicious Spanish anchovies, the user may input the term 'anchovies' into the tree branch search mechanism 130. The search interface returns a tree like set of links that includes branches (parameters) separately entitled: definition 110a, purchase 110b, recipes 110e, population & migration 110c, custom 110f, fishing industry 110d, and favorites 110g. The graphical branch extends out to a second level, where the user can view and emphasize the second level of each search containing terms. Under the branch definition 110a, the user may find three definitions 113a, 113b, 113c and scientific classifications of different anchovy species with a further branch underneath entitled 'Science' 114a, 114b, 114c. Each subject element represented on the branches is a clickable (user selectable), linked piece of content. Underneath 'purchase' 111b there are various vendors 116a, 116b who sell anchovies including the largest distributor of imported anchovies in the world. One of these vendors 116a, 116b could be the importer that the user is interested in buying the anchovies from. The user can click on the vendors sub-branch elements 116a, 116b to find out more about the respective vendors, if not the other branches may lead the user to the anchovies.

In this regard, the custom branch may be of interest because the user remember this little Spanish town where the elders lived to a very old age, supposedly due to their custom of eating the local anchovies every day. The user's graphical branch-like search experience is intuitive because it takes the user down a logical path versus returning pages of results that attempt to match an irrelevant term in a somewhat arbitrary return of data. This method of branch-like searching creates a logical path to data. This logical path also requires coding in the database to create programmed field relationships between terms and key elements of those terms so that the searched for term can be formatted into a branch type search that will actually yield logical and more specific results as the branch of the tree becomes smaller and smaller until the user is searching the 'capillary of the leaves of the tree.' It is to be understood that there may be more or less branches with varying parameters and terms.

Figure 7:
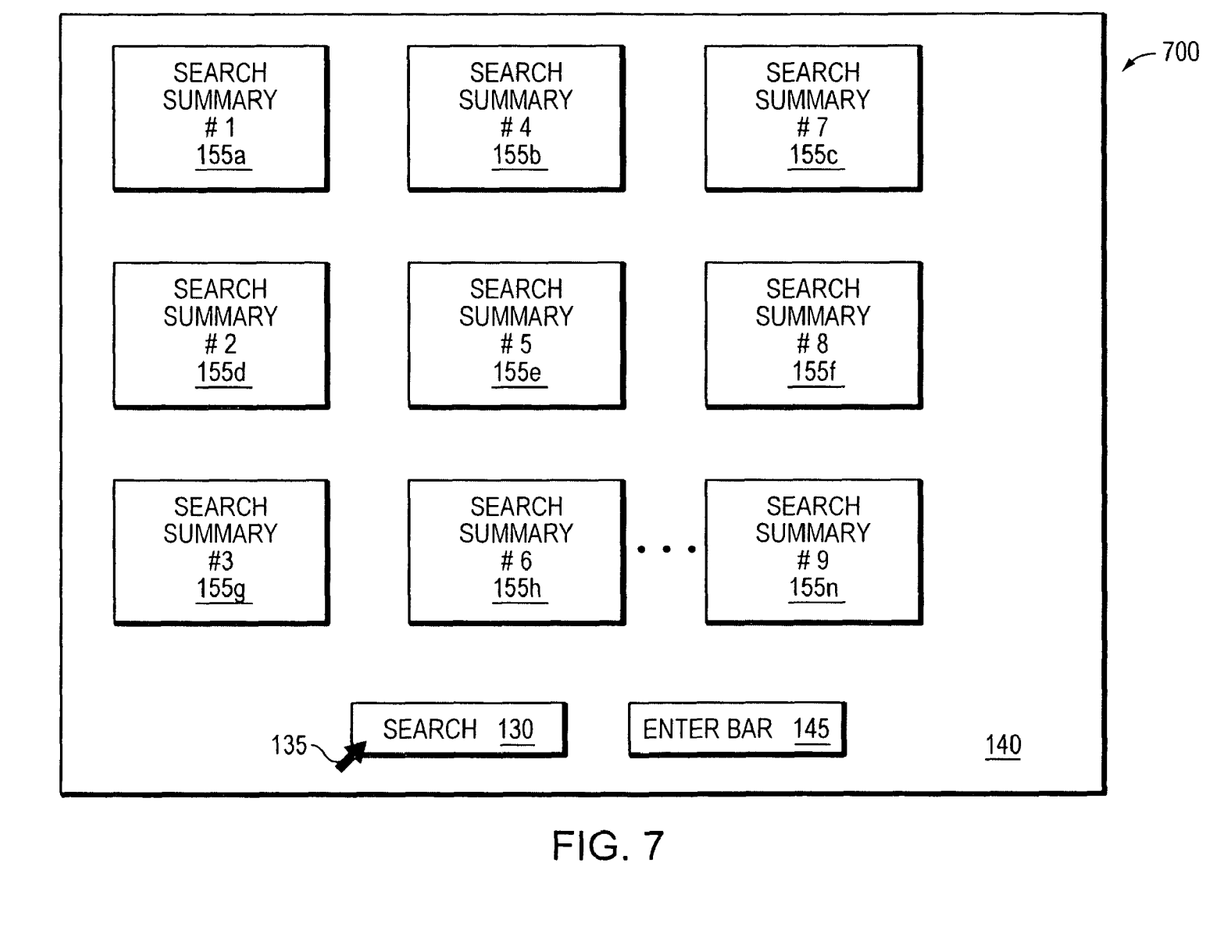
FIG. 7 is a schematic diagram of a search summary embodying the present invention.

FIG. 7 is a schematic diagram 700 of at least one search summary produced by systems embodying the present invention. The search summary 155a, 155b, . . . , 155n may include the number of match results. The size of the search summary may vary depending on the number of searches a user performed. The search summaries may include results of searches and results of refined searches.

Figure 8:
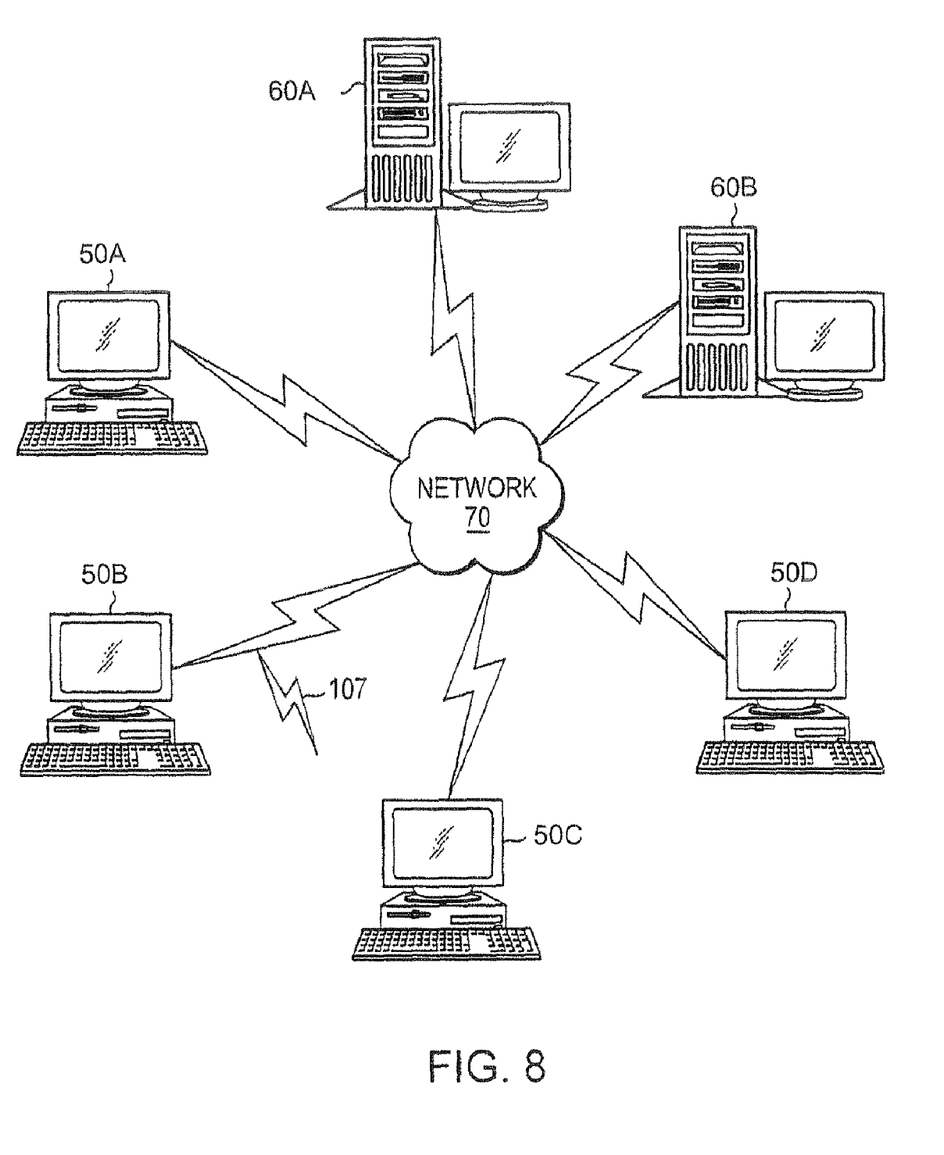
FIG. 8 is a schematic view of a computer environment in which the principles of the preset invention may be implemented.

FIG. 8 illustrates a computer network or similar digital processing environment in which the present invention may be implemented.

Client computer(s)/devices 50a, 50b, 50c, 50d (generally referenced 50) and server computer(s) 60a, 60b (generally referenced 60) provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local Area Network (LAN) or Wide Area Network (WAN), and gateways that currently use respective protocols (TCP/IP, Bluetooth, etc.) to communicate with one another. Other electronic device/computer network architectures are suitable.

Figure 9:
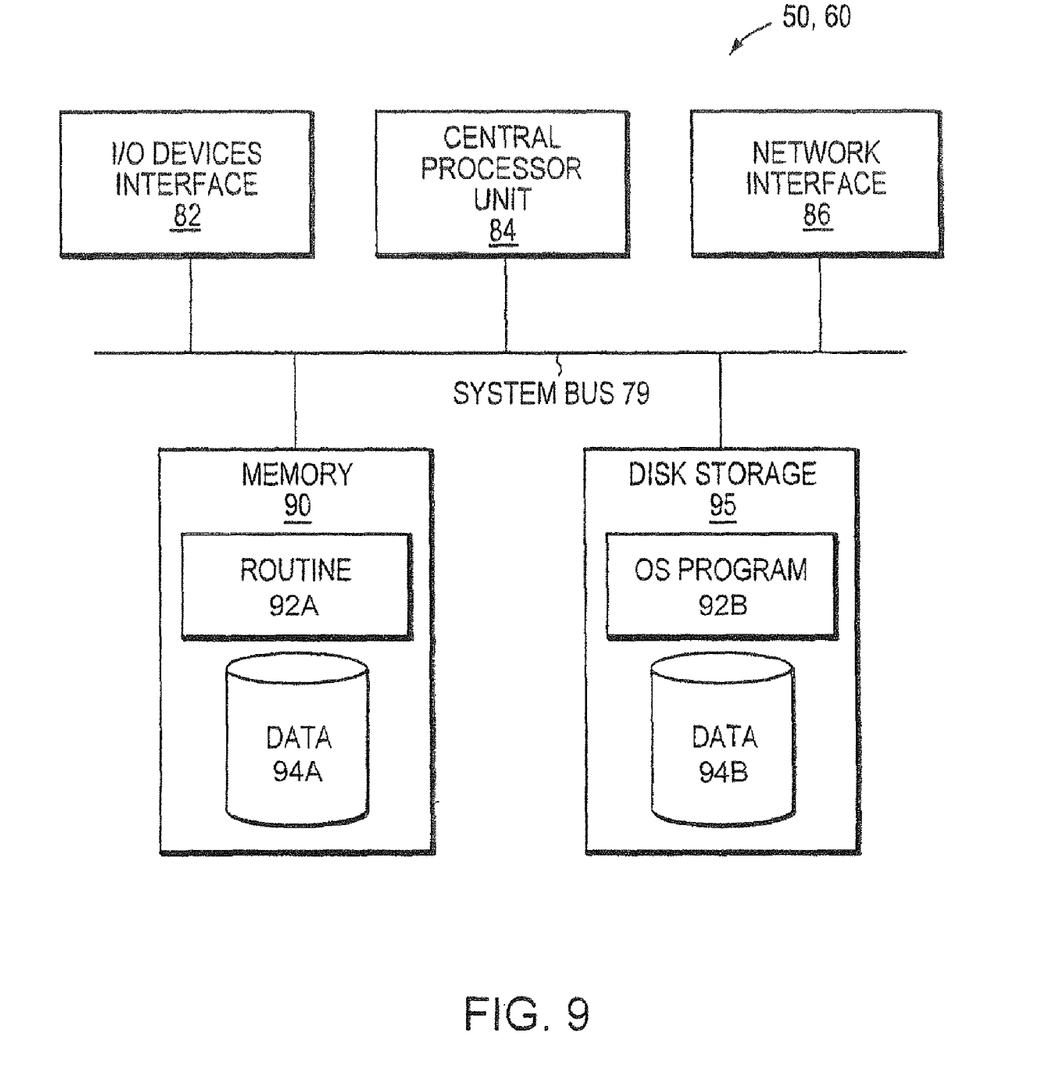
FIG. 9 is a block diagram of the internal structure of a computer from the computer environment shown in FIG. 8.

FIG. 9 is a diagram of the internal structure of a computer (e.g., client processor/device 50 or server computers 60) in the computer system of FIG. 8. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 8). Memory 90 provides volatile storage for computer software instructions including routines 92a and operating system programs 92b (generally referenced 92) and data 94a, 94b (generally referenced 94) used to implement an embodiment of the present invention. Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the computer software instructions 92 and data 94 comprise a computer program product, including a computer readable medium (e.g., a removable storage medium such as one or more DVD-ROM's, CD-ROM's, diskettes, tapes, etc.) that provides at least a portion of the software instructions for the invention system. Computer program product can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the computer software instructions 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Further, the present invention may be implemented in a variety of computer architectures. The computer network of FIGS. 8 and 9 are for purposes of illustration and not limitation of the present invention.

While this invention has been particularly shown and described with references to preferred embodiments thereof, it will be understood by those skilled in the art that various changes in form and details may be made therein without departing from the scope of the invention encompassed by the appended claims.

It should be understood that there may be more or less parameter as indicated above.

It should be further understood that there may be more or less terms as indicated above.

It should be further understood that the flow diagrams of FIGS. 2 and 3 are merely exemplary, and other configurations, arrangements, additional blocks, fewer blocks, and so forth are possible in other embodiments.

What is claimed is:

1. A system, comprising:

a display device configured to display a plurality of searchable fields, wherein the plurality of searchable fields comprises a user-input text field and a plurality of search parameters, wherein the plurality of search parameters further defines a search associated with text input into the user-input text field, wherein the plurality of search parameters comprise a respective range of terms, wherein the range of terms comprises a computer generated user selectable range of terms, and wherein the range of terms narrows the search associated with the input text according to a selection from the range of terms for each search parameter;

means for requesting a first set of search results for the search associated with the text input based on both the input text and the selection from the range of terms; and an interface configured to replace at least a portion of the plurality of search parameters with a plurality of refined search parameters that are automatically generated based on shared characteristics identified from the first set of search results, wherein the plurality of refined search parameters are associated with a respective range of refined terms that is dynamically populated based on the generation of the plurality of refined search parameters, wherein the range of refined terms comprises a user-selectable range of multiple refined terms, wherein the display device is further configured to display the plurality of refined search parameters as a series of concentric rings, wherein the series of concentric rings corresponds in number to the plurality of refined search parameters, and wherein the requesting means is further configured to request a refined search based on the first set of search results and a plurality of refined terms selected from the range of refined terms for each refined search parameter to generate a second set of search results.

2. The system according to claim 1, further comprising a display pointer, wherein the range of terms is displayed as the display pointer traverses across at least one of the plurality of search parameters.

3. The system according to claim 2, wherein the display pointer comprises a cursor.

4. The system according to claim 1, further comprising an output module, wherein the output module is configured to display a summary of the first set of search results by indicating a number of match results.

5. The system according to claim 1, wherein the plurality of search parameters are displayed in a graphical format.

6. The system according to claim 5, wherein the graphical format comprises a plurality of horizontal bars corresponding in number to the plurality of search parameters, and wherein the selection from the range of terms is made via one of the plurality of horizontal bars.

7. The system according to claim 1, wherein the selection of the plurality of refined terms is made via one or more of the concentric rings.

8. The system according to claim 1, wherein the range of terms comprises a numeric range.

9. The system according to claim 1, wherein the plurality of search parameters are categorized by subject, and wherein the range of terms comprises different types of the subject.

10. The system according to claim 9, wherein the subject comprises any of time, biological species, geographical locations, shapes, things, moods, people, traits, sounds, colleges, celebrities, vacations, matchmaking, sports, videos, communities, music, films, or recipes.

11. The system according to claim 1, wherein the display device comprises a touch screen.

12. The system according to claim 1, wherein at least one of the plurality of refined search parameters comprises a subset of one of the plurality of search parameters.

13. A method, comprising:
causing display of a plurality of parameters, wherein the plurality of parameters is associated with a respective range of terms, wherein the range of terms comprises a computer generated user-selectable range of multiple terms;
causing display of the range of terms;
receiving representations of a selection of at least one term in the range of terms;
receiving representations of user-input text;
requesting that a database search engine perform a first search of both the user-input text and the at least one term in the range of terms;
receiving from the database search engine a preliminary search result comprising a plurality of results;
analyzing the plurality of results for shared characteristics;
automatically generating a plurality of refined parameters based on the shared characteristics, wherein the plurality of refined parameters are computer generated, and wherein the plurality of refined parameters replaces at least one of the plurality of parameters on display;
causing display of respective ranges of refined terms associated with the plurality of refined parameters based on the preliminary search result, wherein the respective ranges of refined terms comprise multiple user-selectable terms that are dynamically populated based on the generation of the plurality of refined parameters, wherein the plurality of refined parameters are displayed as a series of concentric rings, and wherein the series of concentric rings corresponds in number to the plurality of refined parameters;
requesting that the database search engine perform a second search based on the preliminary search result and at least one refined term selected from the respective ranges of refined terms; and
receiving a refined search result from the database engine.

14. The method according to claim 13, wherein receiving the refined search result comprises receiving a smaller number of matches than the preliminary search result.

15. The method according to claim 13, further comprising enabling selection of the range of refined terms from a touch screen.

16. The method according to claim 13, further comprising categorizing the range of terms by one or more types of subjects, wherein the plurality of parameters identify the subjects.

17. The method according to claim 13, further comprising causing the selected refined term to be displayed in graphical form.

18. The method according to claim 13, wherein causing display of the range of terms comprises causing display of different file formats.

19. The method according to claim 13, wherein the series of concentric rings provides for a selection of the at least one refined term.

20. The method according to claim 13, wherein the user-input text is not displayed in the range of terms.

21. The method according to claim 13, further comprising:
causing a graphic display of the plurality of refined parameters to be arranged as a plurality of horizontal bars corresponding in number to the plurality of refined parameters; and
receiving an indication that the at least one refined term has been selected via one of the plurality of horizontal bars.

22. An apparatus, comprising:
means for displaying a plurality of parameters, wherein the plurality of parameters are associated with respective ranges of search terms;
means for displaying the associated ranges of search terms;
means for receiving user-input text;
means for requesting a preliminary search for both the user-input text and at least one term selected from the associated ranges of search terms;
means for receiving a preliminary search result comprising a plurality of search results that is returned in response to the preliminary search;
means for receiving a plurality of refined parameters based on shared characteristics of the plurality of search results, wherein the plurality of refined parameters replace at least part of the displayed plurality of parameters;
means for displaying a range of refined search terms for one or more of the plurality of refined parameters, wherein the range of refined search terms comprises multiple user-selectable terms that are dynamically populated based on the plurality of refined parameters, wherein the means for receiving is further configured to display the plurality of refined parameters as a series of concentric rings, and wherein the series of concentric rings corresponds in number to the plurality of refined parameters; and
means for requesting a refined search based on both the preliminary search result and one or more terms selected from the range of refined search terms.

23. The apparatus according to claim 22, wherein the means for displaying the associated ranges of search terms is configured to display the search terms in response to a pointer passing across one of the plurality of parameters.

24. The apparatus according to claim 23, further comprising means for displaying a different range of search terms in response to the pointer passing across at least one of the plurality of parameters.

25. The apparatus according to claim 22, wherein the means for displaying a range of refined search terms is configured to display the series of concentric rings in a graphical format.

26. The apparatus according to claim 22, wherein the associated ranges of search terms comprise usage rights.

27. The apparatus according to claim 22, wherein the series of concentric rings are configured to provide for a user-selection of the one or more terms from the range of refined search terms.

28. The apparatus according to claim 22, wherein the means for displaying a plurality of parameters is configured to display the parameters in a textual form.

29. The apparatus according to claim 22, further comprising: means for receiving a selection of the one or more terms via the series of concentric rings.

30. A tangible memory device having stored thereon computer executable instructions that, in response to execution by a computing device, cause the computing device to perform operations comprising:
    causing display of a search parameter, wherein the search parameter is associated with a range of search terms;
    causing display of the range of search terms as a pointer traverses across the search parameter;
    receiving representations of user-input text;
    requesting a preliminary search based on both the user-input text and at least one term selected from the range of search terms;
    receiving a preliminary search result comprising a plurality of search results;
    analyzing the plurality of search results for a shared characteristic;
    identifying a refined search parameter based on the shared characteristic, wherein the refined search parameter is computer generated, and wherein the refined search parameter replaces the search parameter on display;
    causing display of a range of refined search terms associated with the refined search parameter, wherein the range of refined search terms comprises multiple user-selectable terms are dynamically populated based on the generation of the refined search parameter, wherein a plurality of refined search parameters are displayed as a series of concentric rings, and wherein the series of concentric rings corresponds in number to the plurality of refined search parameters; and
    requesting a refined search based on the preliminary search result and at least one refined term selected from the range of refined search terms.

31. The tangible memory device according to claim 30, wherein the range of refined search terms comprises a subset of the range of search terms.

32. The tangible memory device according to claim 30, wherein the search parameter identifies a category of subjects, and wherein the range of search terms identifies the subjects within the category.

33. The tangible memory device according to claim 30, wherein the operations further comprise requesting both the preliminary search and the refined search to be performed by a database search engine.

\* \* \* \* \*

UNITED STATES PATENT AND TRADEMARK OFFICE
CERTIFICATE OF CORRECTION

PATENT NO. : 7,849,096 B2  
APPLICATION NO. : 11/685536  
DATED : December 7, 2010  
INVENTOR(S) : Fein et al.

Page 1 of 1

It is certified that error appears in the above-identified patent and that said Letters Patent is hereby corrected as shown below:

Column 2, line 67, delete "111a," and insert -- 110a, --.

Column 4, line 34, delete "110b" and insert -- 110b, --.

Column 5, line 57, delete "virdigenalis"" and insert -- viridigenalis" --.

Column 6, line 29, delete "(user selectable)," and insert -- (user-selectable), --.

Column 6, line 30, delete "111b" and insert -- 110b --.

Column 8, line 35, in Claim 1, delete "user selectable" and insert -- user-selectable --.

Column 11, lines 17-18, in Claim 30, delete "computer executable" and insert -- computer-executable --.

Column 12, line 10, in Claim 30, delete "are" and insert -- that are --.

Signed and Sealed this  
Twentieth Day of September, 2011

David J. Kappos  
*Director of the United States Patent and Trademark Office*